United States Patent [19]

Buchan et al.

[11] 4,082,237

[45] Apr. 4, 1978

[54] SAFETY PICKER FOR MAGNETIC TAPE LEADER

[75] Inventors: William A. Buchan, Newport Beach; Gerhard Rotter, Mission Viejo, both of Calif.

[73] Assignee: BASF Aktiengesellschaft, Ludwigshafen, Germany

[21] Appl. No.: 791,387

[22] Filed: Apr. 27, 1977

[51] Int. Cl.² ........................................... G11B 15/66
[52] U.S. Cl. .................................... 242/192; 242/195
[58] Field of Search .................. 242/192, 195, 210; 360/95, 96

[56] References Cited

U.S. PATENT DOCUMENTS

| | | | |
|---|---|---|---|
| 3,370,803 | 2/1968 | Newell | 242/192 |
| 3,773,276 | 11/1973 | Ganske | 242/192 |
| 3,836,094 | 9/1974 | Hollingsworth | 242/192 |

Primary Examiner—George F. Mautz
Attorney, Agent, or Firm—Keil, Thompson & Shurtleff

[57] ABSTRACT

In a tape transport system in which the take-up reel of a self-threading magnetic recording tape having a leader attached to its forward end is driven by surface engagement with a rotating capstan, a safety picker is provided at a point just beyond the area of engagement between the take-up hub and the capstan, for intercepting the leader if it fails to properly engage the hub. A contact cooperating with the safety picker causes the threading operation to be discontinued if the leader has thus been intercepted.

7 Claims, 3 Drawing Figures

U.S. Patent
April 4, 1978
4,082,237
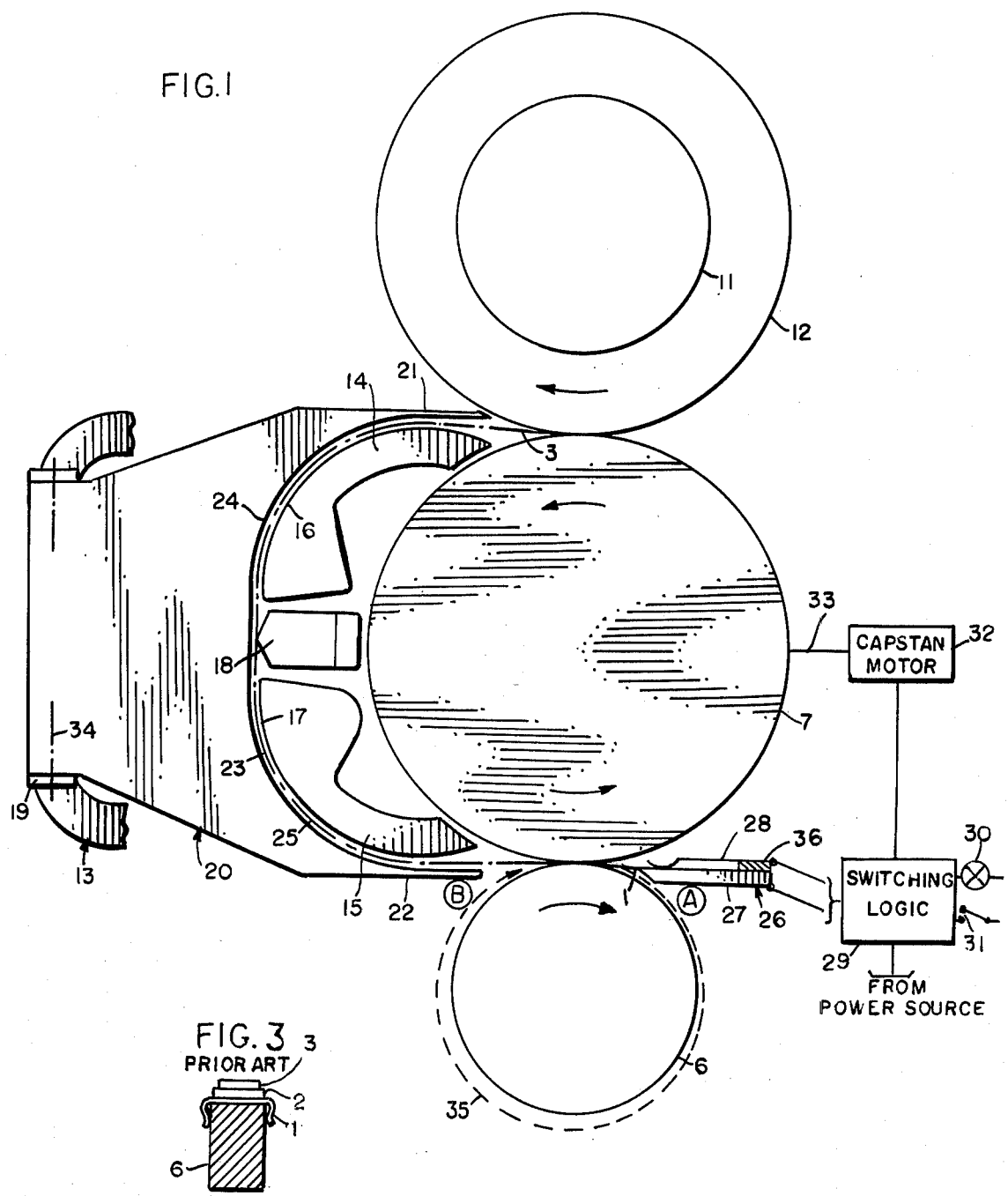
FIG. 1
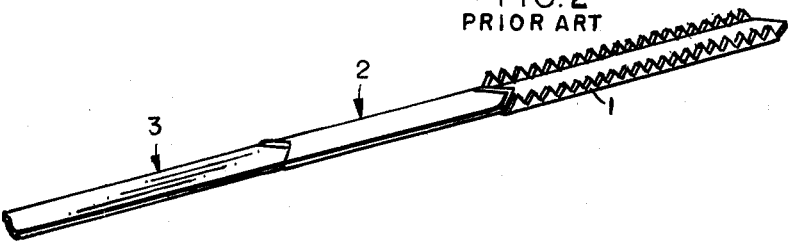
FIG. 2 PRIOR ART
FIG. 3 PRIOR ART

SAFETY PICKER FOR MAGNETIC TAPE LEADER

BACKGROUND OF THE INVENTION

The invention relates to tape transport systems of the type in which the take-up reel of a self-threading magnetic recording tape is driven by surface engagement with a rotating capstan; and it relates more particularly to a safety arrangement in such a system by which accidental spillage or jam-up of the tape during the threading operation is prevented.

In order to render the thin magnetic tape self-threading, a thicker but flexible leader having teeth on its edges is typically attached to the forward end of the tape. As the supply reel in the self-threading operation begins to be rotated by the driven capstan, the forward end of the leader is peeled off this tape reel by a peeling device and the leader is then advanced—usually past a guide partially surrounding the capstan and past one or more magnetic heads—towards the interface between the capstan and the take-up reel. Normally, after the tip of the leader has been gripped in the nip between the capstan and the take-up hub, the teeth of the leader securely grip the sides of the take-up hub near its periphery and the leader, followed by the tape itself, is wound on the take-up hub. A self-threading arrangement of the kind just described has been disclosed, for example, in U.S. Pat. No. 3,955,777 to D. L. Burdorf. Alternative designs of self-threading leaders of a type which may be utilized with the present invention are disclosed in U.S. Pat. No. 3,773,276 to K. E. Ganske and U.S. Pat. No. 3,836,094 to A. J. Hollingsworth, both of which also have gripping teeth, and U.S. Pat. No. 3,370,803 to C. W. Newell which uses an adhesive surface to detachably secure the leader to the tape pack and take-up reel.

OBJECTS AND SUMMARY OF THE INVENTION

It is a primary object of the invention to provide a safety arrangement by which spillage or jamming of the tape incidentally to the threading operation is avoided if, because of a non-standard condition such as an excessive wear of the leader teeth, the tip of the leader fails to grip the take-up reel. It is a further object of the invention to cause the threading operation to be stopped when the above safety arrangement becomes effective in such a contingency.

Briefly, the foregoing is accomplished by providing a picker device at a point just beyond the contact area between the take-up hub and the capstan which will guide the leader away from the take-up hub if the leader fails to properly engage this hub. Preferably an electrical switch is used in conjunction with the safety picker which operates the logic elements of the system to prevent further threading of the transport whenever the leader is intercepted by the safety picker.

BRIEF DESCRIPTION OF THE DRAWING

A preferred embodiment of the invention will now be described with reference to the drawing in which:

FIG. 1 shows a tape transport apparatus embodying a safety picker device according to the invention, together with the circuit connections of this device.

FIG. 2 is a perspective view of a leader assembly, known per se, which may be used in connection with the present invention.

FIG. 3 is a cross-sectional view of part of the take-up hub with the leader assembly of FIG. 2 wound thereon.

Referring now to FIG. 1, there is shown a supply hub 11 and a take-up hub 6. It has been assumed in FIG. 1 that all of tape 3 is still wound on the supply hub 11 so as to form supply reel 12 of magnetic recording tape whereas take-up hub 6 still has no tape wound thereon at this time. The drive of the supply reel 12 and take-up hub 6—or, subsequently the tape wound on this last-mentioned hub to form a take-up reel—takes place by means of a capstan 7 disposed between the two hubs and driven by a capstan motor 32 through a shaft 33. The two hubs 11 and 6 are rotationally supported on carriages or swing arms which are urged against capstan 7 by means of a spring or the like not shown in FIG. 1. As a result, the supply reel and the take-up reel are driven by surface contact with capstan 7 in the manner well known in the art. Reference in connection with tape transports of this kind is made to U.S. Pat. Nos. 3,921,933 to Rotter et al or 3,980,253 to Burdorf, for example.

The path of the tape from the area of contact between the supply reel 12 and capstan 7 and that between the take-up hub or reel and the capstan 7 is indicated in FIG. 1 by dot-dash line 25. As will be seen from this figure the tape is guided around two generally crescent-shaped guide elements 14, 15 which are preferably in the form of air guides to cushion the contact between the tape and the guide elements. Between guide elements 14, 15 a magnetic head 18 is provided the tip of which contacts the tape as it moves past the magnetic head for the purpose of recording information magnetically on the tape and of playing back the magnetically recorded information. More than one magnetic head may be provided if desired.

It will be noted that in FIG. 1 magnetic head 18 contacts tape 3 from the right as viewed in this figure and, in keeping with this, the tape is wound on hub 11 with its magnetic layer facing outwardly; as a result, it is the magnetic layer side rather than the support side of the tape which faces head 18 as well as the guide surfaces 16, 17 of the two air guide sections 14, 15. It should be pointed out that this feature does not form a part of the present invention and that in fact the instant invention is equally applicable to transports in which the tape is wound on the reels with its magnetic layer facing inwardly.

Air guide sections 14 and 15 are part of a scanner assembly formed principally by a scanner block 13 cast of some suitable metal; only part of the scanner block has been shown in FIG. 1. On the left end of this block as viewed in this figure, a pair of upstanding ears 19 are formed between which a picker plate 20 of plastic material is supported rockably about axis 34. Picker plate 20 is generally U-shaped, its curved right surface 24 as viewed in FIG. 1 being formed so that, with plate 20 in the operative position illustrated in this figure, between the surface 24 and surfaces 16, 17 of the two air guide sections a channel 23 remains through which the tape passes in operation. Picker plate 20 has at its two ends two finger-like extensions 21 and 22, respectively. Extension 21 is pointed at its end and serves as a picker, hereinafter also referred to as the principal picker, and functions in a manner further explained below to peel the leader attached to the forward end of the magnetic tape, off the supply reel 12 in the threading operation. Extension 22 is rounded at its end and it acts mainly to guide the leader and tape in the direction of the nip between capstan 7 and take-up hub 6. By virture of its pivotal support in ears 19 picker plate 20 may be swung upwardly, that is from its operative position shown into an out-of-the-way-position.

In the present embodiment the leader attached to the forward end of the magnetic tape is assumed herein of the kind, known per se, which is illustrated in FIGS. 2 and 3 and disclosed in the above U.S. Pat. No. 3,955,777 issued to D. L. Burdorf on May 11; 1976, on a self-threading leader for a reel of tape. The disclosure of U.S. No. Pat. 3;955,777 should be considered incorporated herein by way of supplement to the present disclosure. As described in this patent, the leader—which is of a flexible material such as polypropylene—has a toothed portion 1 at its forward end and an untoothed portion 2 spliced to the rear of portion 1 at one end and to the forward portion of magnetic tape 3 at the other end in the manner shown. The two rows of teeth of portion 1 are spaced so that these teeth will not grip the edges of the outermost convolutions of the tape when wrapped around the supply reel. Instead the teeth grip only the untoothed portion 2 of the leader. This facilitates the gripping of itself by the leader to maintain the integrity of the supply reel of tape and it also facilitates the automatic wrapping of the leader around the take-up hub 6, the latter being correspondingly wider to permit the leader to grip its edges as shown in FIG. 3.

The leading end of toothed leader portion 1 is free to extend tangentially away from the periphery of the supply reel. Consequently, when the tape transport is started at the beginning of the self-threading operation, principal picker 21 of picker plate 20 acts to release the hold of the teeth of leader portion 1 on the edges of leader portion 2 as the supply reel is rotated by capstan 7 in the direction indicated in FIG. 1. As explained in U.S. Pat. No. 3,955,777 the length of toothed leader portion 1 is somewhat less than the circumference of take-up hub 6 as a result of which the point at the front end of portion 1 penetrates into the complementary recess of the trailing end of this portion to prevent a bump from occuring when the leader is wrapped around the periphery of take-up hub 6 as shown in FIG. 3. The leading and trailing ends of the other leader portion 2 have a similar complementary relationship. The length of leader portion 2 likewise is somewhat less than the circumference of take-up hub 6 so that no bump occurs when leader portion 2 is wrapped on top of leader portion 1 around the periphery of take-up hub 6. It will be understood that as the leader emerges from tape channel 23 it is guided towards the nip between capstan 7 and take-up hub 6 with the aid of picker plate extension 22 and that, as not particularly shown in FIG. 1 hereof but as illustrated in the Burdorf patent, it wraps around the take-up hub 6 with its teeth facing inwardly in the direction of the center of the axis of this hub. This may also be seen from the cross-sectionl view of FIG. 3 which also shows that leader portion 2 has the same width as the take-up hub 6 but that it is wider than magnetic recording tape 3.

The leader wraps itself around take-up hub 6 in the manner just described provided the teeth of forward portion 1 of the leader effectively engage the side surfaces of this hub. As a result of live tests performed in the laboratory, in which the threading apparatus was continuously cycled, we have found, however, that after hundreds of hours of use the teeth on the plastic leader began to break down and the tip of the leader failed to grip the take-up hub. The foregoing can give rise to one of two problems:

(1) If the leader fails to grip the take-up hub altogether, tape will spill out in the region marked "A" in FIG. 1, causing a jam-up.
(2) If only the leading tip of the leader fails to engage the take-up hub while the remainder of the leader will grip the hub, the leader will follow the general course marked by broken line 35 in FIG. 1 and will protrude in the region marked "B" in FIG. 1, thereby jamming or even cutting the tape.

According to the present invention means have been provided to reject a defective tape before such a jam or damage occurs. With this objective in mind a safety picker collectively designated 26 in FIG. 1 has been provided which intercepts the tip of a leader that has failed to properly grip the circumferential portion of the take-up hub and thus protrudes from it as indicated at "1" in FIG. 1.

Safety picker 26 has a body 27 with a pointed end as shown and this body has a width smaller than the spacing of the teeth of the leader so as to be easily cleared by the latter. It may be added that picker plate 20 the curved portion of which is straddled by the teeth of the leader as the latter advances through tape channel 23 during the threading operation, is also of a thickness small enough to keep these teeth from gripping the sides of the picker plate. Body 27 of the safety picker is preferably made of a conductive material. The safety picker assembly 26 includes a conductive spring contact 26 mounted on conductive body 27 through the medium of an insulating plate 36, thereby forming a normally closed contact with this conductive body. A defective leader tip that fails to engage the take-up spool will be intercepted by the pointed end of the safety picker and, by being driven between this conductive body and the end of contact spring 28 will open this contact, thereby changing the circuit condition of switching logic 29 to which the contact is connected.

As will be seen from FIG. 1 switching logic 29 is interposed in the circuit between capstan motor 32 and its power source. The opening of contact 27, 28 may simply be used to open the circuit between the power source and the capstan motor in the switching logic, thereby to discontinue the operation of the motor. Alternatively, the switching logic may be designed to reverse the power leads to motor 32, thereby to cause the capstan to be driven in the opposite direction so as to initiate an unthreading operation; this operation may be terminated in any desired manner for example by means of a sensing device cooperating with a mechanical or optical marking on the leader or alternatively by a timer. The details of these switching functions have not been shown herein as their implementation will be obvious to persons skilled in the art. Reference, however, may be made to U.S. Pat. No. 3,958,272 of Rotter et al in which a capstan motor reversing circuit has been schematically shown. If desired, an alarm, such as by the lighting of lamp 30, may be given by logic 29 simultaneously with one of the switching operations just mentioned. In addition manual switch 31 may be provided in order to cause the capstan motor to be stopped or reversed by the user.

While a specific embodiment of the invention has been described herein, this should not be construed in a limiting sense.

We claim:

1. In a self-threading recording-tape transport system in which a take-up reel having a hub, is driven by surface engagement with a rotating capstan, said tape having a leader attached thereto, an arrangement for preventing accidental jamming of the tape during the threading of the tape leader onto the hub of the take-up reel, said arrangement comprising a picker disposed at a point just beyond the area of engagement between the take-up hub and the capstan, for deflecting the leader away from the take-up hub if the leader fails to properly engage said hub.

2. In a self-threading recording-tape transport system the arrangement as claimed in claim 1 wherein in conjunction with said picker there is provided an electrical switch and switching means controlled by said switch for causing the threading operation of said system to be discontinued if the leader has been intercepted by said picker.

3. In a self-threading recording-tape transport system the arrangement as claimed in claim 2 wherein said picker is at least partially of conducting material and wherein said switch is a normally closed contact comprising said picker as one element and a contact spring as the other element, said contact being forced open by the tip of said leader if said leader is intercepted by said picker.

4. In a self-threading recording-tape transport system the arrangement as claimed in claim 2 wherein said system comprises a capstan motor and wherein said switching means are connected to said motor and to said electrical switch, said switching means being effective upon the operation of said switch to reverse the driving direction of said motor.

5. In a self-threading recording-tape transport system in which a supply reel and a take-up reel, whereof at least said take-up reel has a hub, are simultaneously driven by surface engagement with a rotating capstan, said tape having a leader attached thereto, the arrangement as claimed in claim 1 wherein said leader has a portion having inwardly projecting teeth formed along its edges, said teeth being spaced so as to secure said leader and recording tape when said leader is coiled about the circumference of said supply reel; and wherein said picker is of a width smaller than the spacing of said teeth.

6. In a self-threading recording-tape transport system in which a supply reel and a take-up reel, whereof at least said take-up reel has a hub, are simultaneously driven by surface engagement with a rotating capstan, said tape having a leader attached thereto, a guiding arrangement for said leader, said arrangement comprising a first picker disposed at a point just beyond the area of engagement between said supply reel and said capstan, for peeling the leader off said supply reel, and a second picker disposed at a point just beyond the area of engagement between the take-up hub and the capstan, for deflecting the leader away from the take-up hub if the leader fails to properly engage said hub, whereby accidental jamming of the tape during the threading of the leader onto said hub is avoided.

7. In a self-threading recording-tape transport system the arrangement as claimed in claim 6 wherein there is provided a scanner assembly including a guide means extending partially about said capstan generally from the area of engagement between said supply reel and said capstan to the area of engagement between said take-up reel and said capstan, and having a substantially crescent-shaped outer surface;

said scanner assembly having pivotally mounted thereon a picker plate having at each of its two ends an extension in the direction of said two areas, respectively, one of said extensions being shaped to form said first picker; and said picker plate, when in its operative position, extending around said guide means in proximity to but in spaced relation with said outer surface so that said surface and said picker plate define a tape path therebetween.

* * * * *